F. L. RAPSON.
LIFTING JACK AND THE LIKE FOR USE ON MOTOR ROAD AND OTHER VEHICLES.
APPLICATION FILED AUG. 8, 1917.

1,322,949.

Patented Nov. 25, 1919.
7 SHEETS—SHEET 1.

INVENTOR
F. L. RAPSON

F. L. RAPSON.
LIFTING JACK AND THE LIKE FOR USE ON MOTOR ROAD AND OTHER VEHICLES.
APPLICATION FILED AUG. 8, 1917.

1,322,949.

Patented Nov. 25, 1919.
7 SHEETS—SHEET 3.

F. L. RAPSON.
LIFTING JACK AND THE LIKE FOR USE ON MOTOR ROAD AND OTHER VEHICLES.
APPLICATION FILED AUG. 8, 1917.

1,322,949.

Patented Nov. 25, 1919.
7 SHEETS—SHEET 4.

INVENTOR
F. L. RAPSON

F. L. RAPSON.
LIFTING JACK AND THE LIKE FOR USE ON MOTOR ROAD AND OTHER VEHICLES.
APPLICATION FILED AUG. 8, 1917.

1,322,949.

Patented Nov. 25, 1919.
7 SHEETS—SHEET 5.

INVENTOR
F. L. RAPSON

F. L. RAPSON.
LIFTING JACK AND THE LIKE FOR USE ON MOTOR ROAD AND OTHER VEHICLES.
APPLICATION FILED AUG. 8, 1917.
1,322,949.
Patented Nov. 25, 1919.
7 SHEETS—SHEET 6.
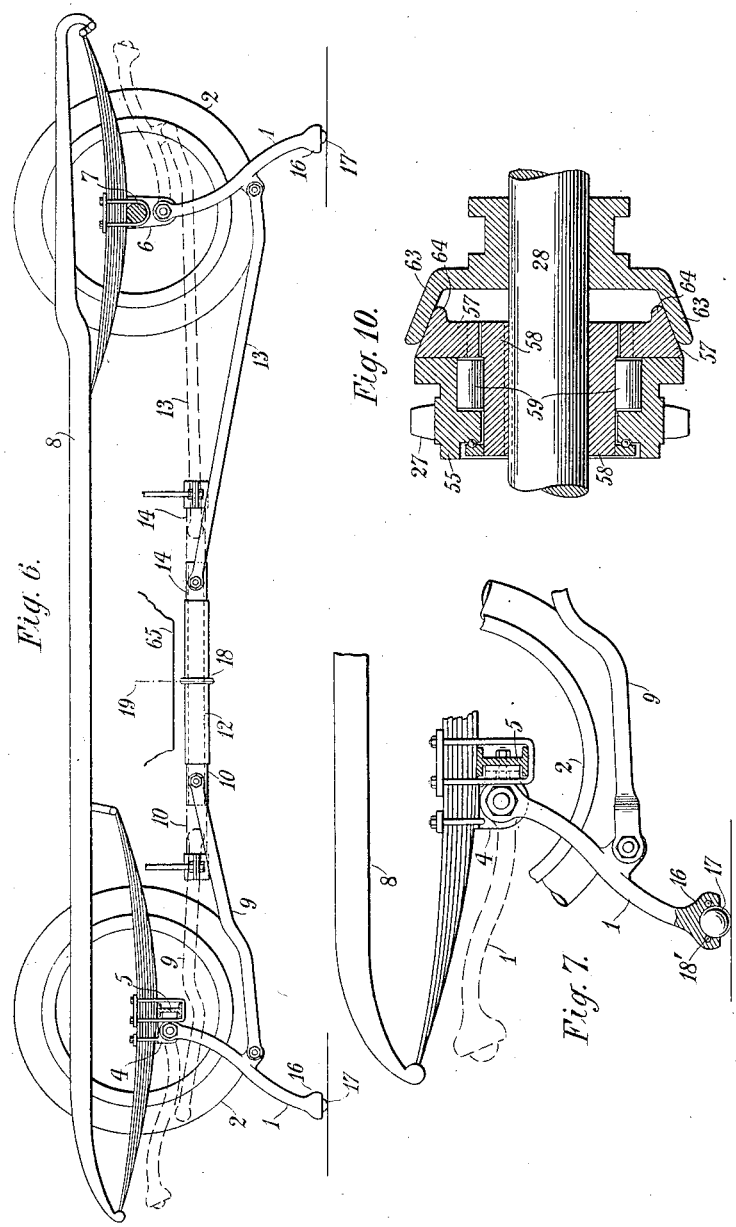
INVENTOR
F. L. RAPSON

UNITED STATES PATENT OFFICE.

FREDERICK LIONEL RAPSON, OF LIVERPOOL, ENGLAND.

LIFTING-JACK AND THE LIKE FOR USE ON MOTOR ROAD AND OTHER VEHICLES.

1,322,949.  Specification of Letters Patent.  Patented Nov. 25, 1919.

Application filed August 8, 1917. Serial No. 185,134.

*To all whom it may concern:*

Be it known that I, FREDERICK LIONEL RAPSON, a subject of His Majesty the King of England, and resident of Liverpool, in the county of Lancaster, Kingdom of England, have invented certain new and useful Improvements in or Relating to Lifting-Jacks and the like for use on Motor Road and other Vehicles, of which the following is a specification.

This invention relates to improvements in lifting jacks and the like for use on motor road and other vehicles.

The invention has for its object to provide on a motor road vehicle such as a motor car, means for lifting the car from the ground, which means are adapted to be actuated by the engine of the car or otherwise so that the weight of the car can be taken off the wheels to relieve the tires when in the garage, or to jack the car up when it is desired to repair punctures or effect other repairs, or to raise the car for washing or inspection purposes.

A further object is to provide under the chassis of the vehicle a plurality of levers or lifting jacks which will automatically raise or lower the car to any predetermined height in considerably less time than it would take to get the ordinary hand jack from the car.

A still further object is to so construct the lifting means that the weight of the car will be distributed over a large area, the lifting means will be stronger and quicker in action, the car will be higher when in raised position, and the lifting means will occupy a small space when in the inoperative position.

With these and other objects in view the invention consists in providing adjacent to the front and rear axles or other convenient part of the chassis, pivoted levers or the like which are adapted to be actuated by tie members secured to sleeves slidably mounted on a screwed rod driven from the engine or by other suitable means, so that the lower ends of the said levers will engage the ground and raise the vehicle when the screwed rod is rotated in one direction, or the lower ends of the levers will be drawn up and out of action when the screwed rod is rotated in the opposite direction.

The invention also consists in providing means to automatically control the movement of the pivoted lifting levers or jacks so that the car can be raised or lowered to any predetermined distance.

The invention will now be described with reference to the accompanying drawings in which:—

Fig. 6 is a diagram of the lifting levers in their operative position, the inoperative position being shown in dotted lines;

Fig. 7 is a sectional elevation of one of the lifting levers and its attachment to the front axle;

Fig. 10 is a cross section of a modified form of clutch device.

Figure 1:
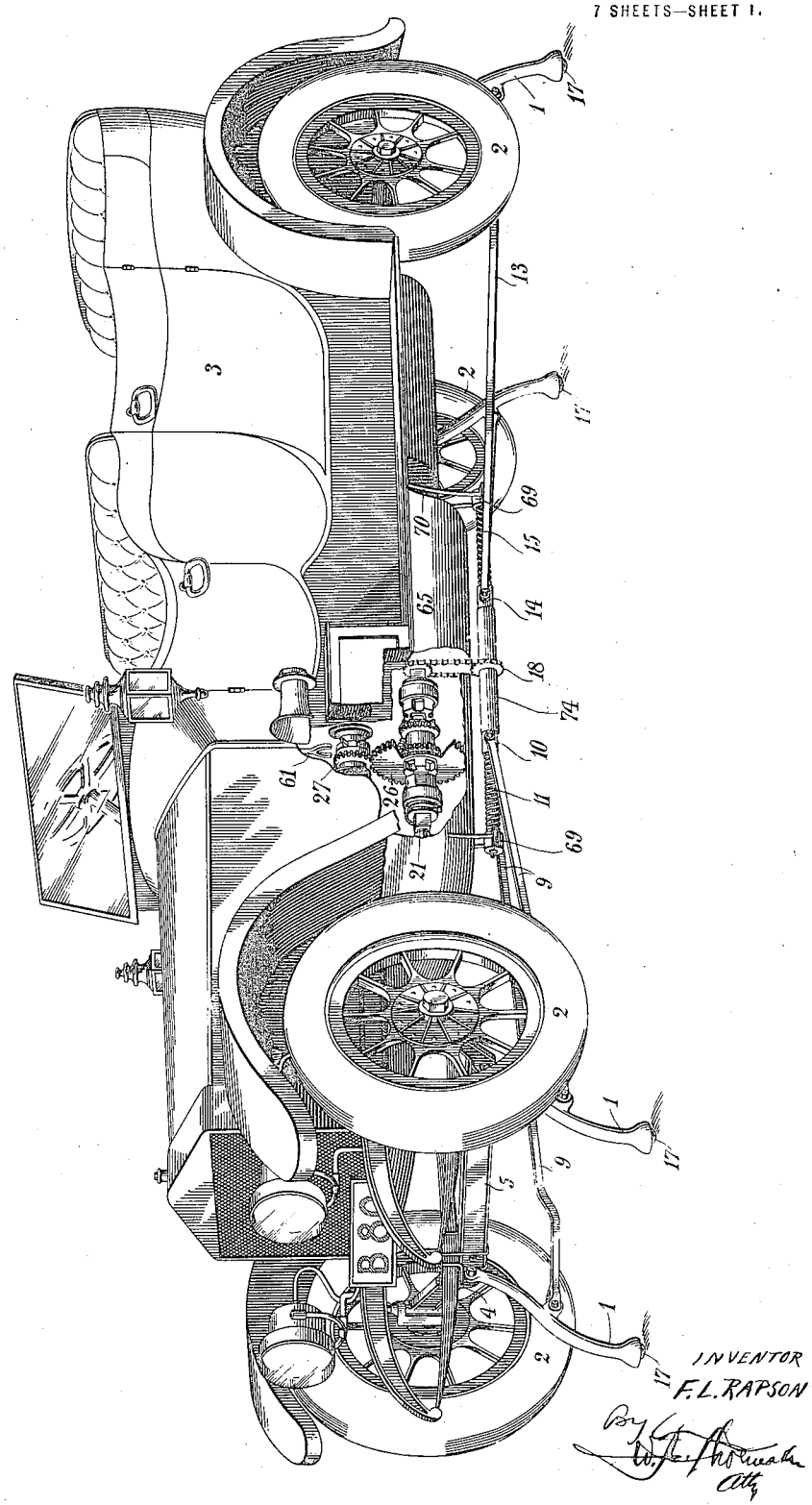
Figure 1 is a perspective view of a motor car showing the invention applied thereto.
Figure 2:
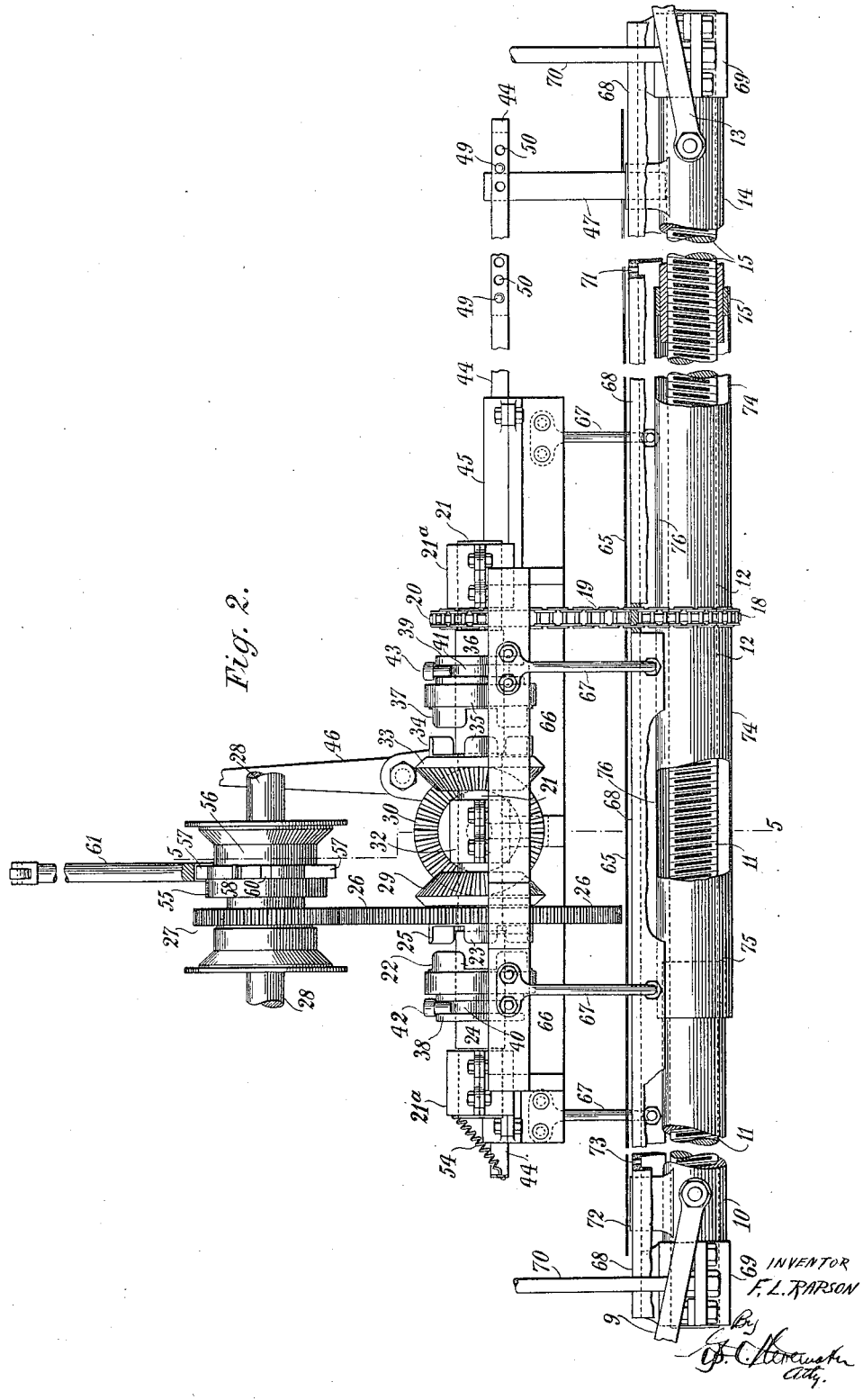
Fig. 2 is a sectional side elevation of the operating mechanism.
Figure 3:
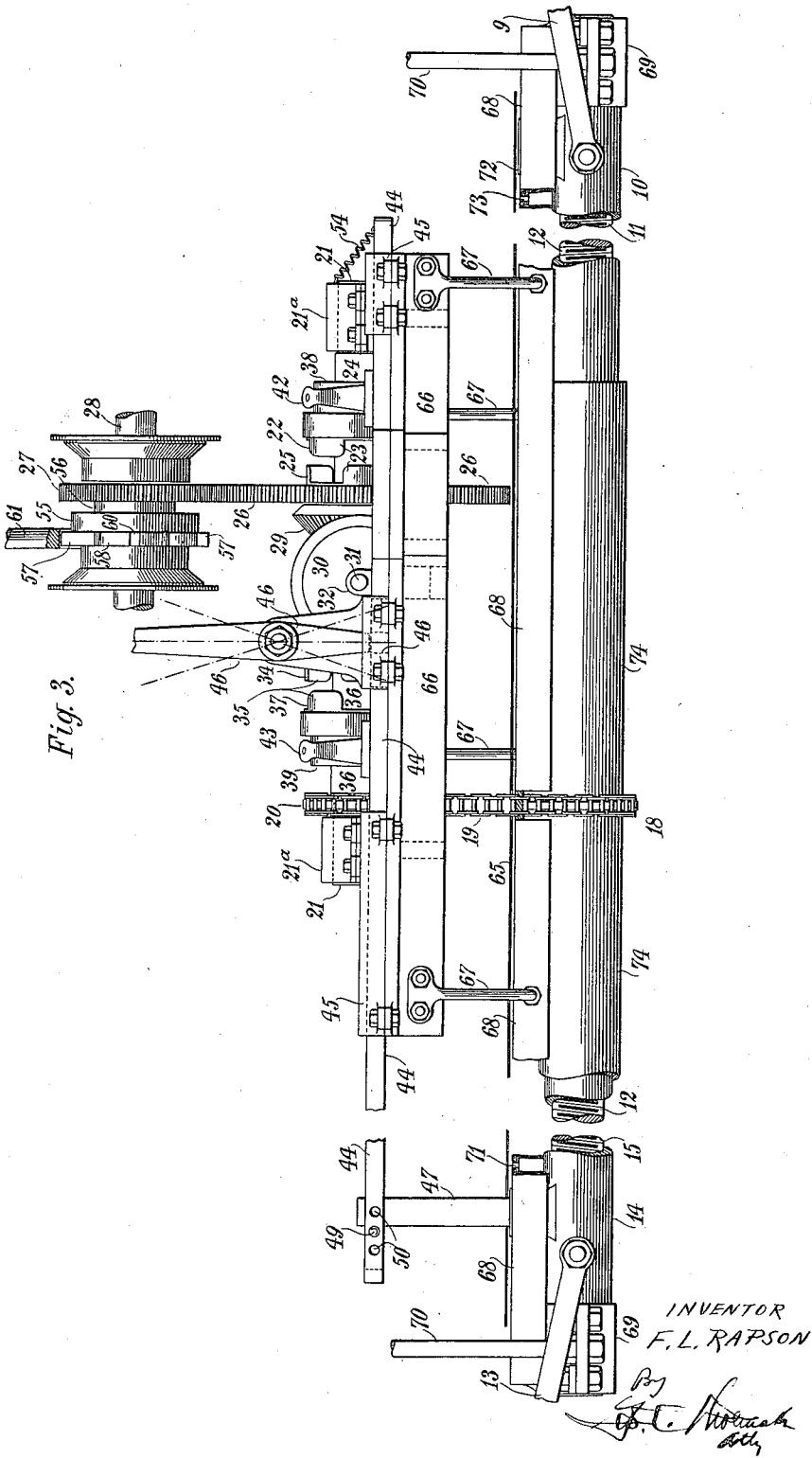
Fig. 3 is a sectional side elevation of the operating mechanism viewed from the opposite side.
Figure 4:
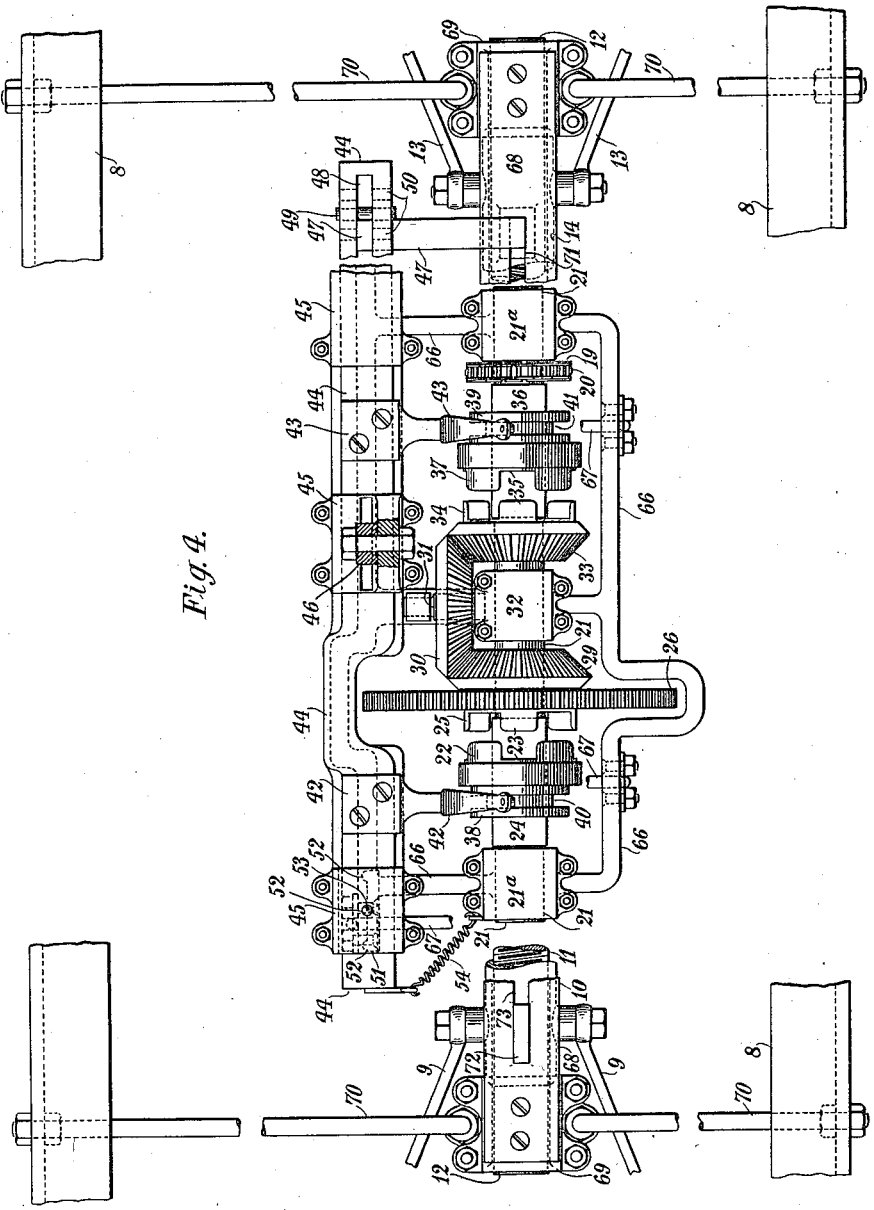
Fig. 4 is a plan thereof.
Figure 5:
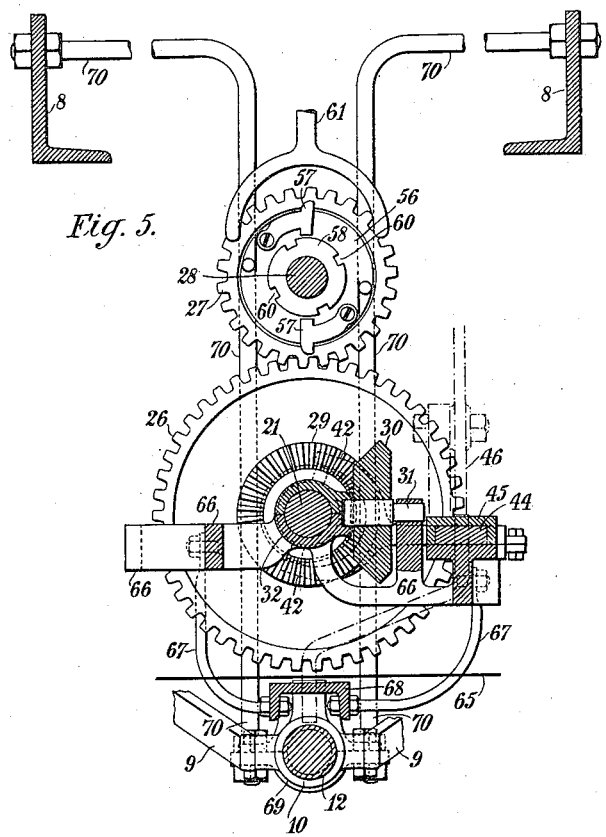
Fig. 5 is a cross sectional elevation on the line 5—5 of Fig. 2.

As shown a lever or the like 1 is pivoted adjacent to each wheel 2 of a motor car or other vehicle 3. The front pair of levers 1 are preferably pivoted at their upper ends to suitable brackets 4 which are secured in any suitable manner to the front axle 5 and the rear pair of levers 1 are similarly pivoted to brackets 6 secured to the rear axle 7 but it will be understood that these levers 1 could be pivoted to any other part of the chassis 8 if so desired. The front pair of levers 1 are pivotally connected by tie bars or other suitable means 9 to a sleeve or the like 10 which is adapted to ride on the screw threaded end 11 of a shaft 12 rotatably mounted longitudinally of the chassis 8. The rear pair of levers 1 is connected in a similar manner by tie bars 13 to another sleeve 14 mounted on the other end of the said shaft 12 which is also provided with a screw thread 15 but oppositely threaded so that when the shaft 12 is rotated in one direction, the levers 1 are turned on their pivots through the medium of the tie bars and the outer ends 16 of the said levers 1 will engage the ground and lift the car 3 therefrom. The outer or lower end of each of these pivoted levers 1 is fitted with a wheel, caster or ball 17 freely rotating on a suitable ball race 18' so that when the levers 1 engage the ground the car 3 can be easily moved or turned in any direction. On the shaft 12 and between the threaded ends 11 and 15 thereof is secured a sprocket wheel 18 which is driven by a chain 19 from another sprocket wheel 20 secured on a shaft 21 disposed parallel with and above the shaft 12. On the shaft 21 carried by bearings 21ª is mounted one portion 22 of a dog clutch or the like 23 which is adapted to be moved longitudinally on a keyed or squared portion 24 of the shaft 21 to engage with the other portion 25 of the dog clutch 23 which is freely mounted on the shaft 21. To this latter portion 25 of the clutch 23 is attached or formed thereon a spur wheel 26 which is adapted to be driven in any suitable manner preferably by another spur wheel 27 mounted on the engine shaft 28. If desired the clutch 23 could be driven through suitable sprocket wheels and a chain from the engine or from the Cardan shaft. The portion 25 of the clutch 23 is also fitted or formed with a bevel gear wheel 29 which is adapted to permanently gear with another bevel wheel 30 disposed at right angles thereto. This latter bevel wheel 30 is freely mounted on a shaft 31 carried by a bearing 32 in which is also mounted the longitudinally disposed shaft 21. Adjacent to the other end of the bearing 32 is freely mounted on the shaft 21 a second bevel wheel 33 which is provided or formed with one portion 34 of a dog clutch or the like 35. Adjacent to this portion of the clutch 35 is slidably mounted on a keyed or squared portion 36 of the shaft 21 the other portion 37 of the clutch which is adapted to be moved, in the manner to be hereinafter described, into engagement with the clutch face 34 on the freely mounted bevel wheel 33. When the clutch 35 is engaged the shaft 21 will be rotated in the opposite direction through the medium of the spur wheels 27 and 26, and bevel wheels 29, 30 and 33. The slidable portion 22 of the clutch 23 and the slidable portion 37 of the clutch 35 are fitted or formed with sleeves 38 and 39 having circumferential grooves 40 and 41 respectively, to receive forked shaped extensions or projections 42 and 43 which are carried by a bar 44 disposed parallel with the shaft 21. This bar 44 which is slidably mounted in suitable bearings 45 is adapted to be moved in one direction or the other by a pivoted lever 46 connected by suitable means such as levers or links to a hand wheel or hand lever preferably disposed adjacent to the driver's seat or at the side of the car, as desired.

The sleeve 14 which operates one pair of pivoted levers 1 is provided with an extension or striker 47 which is adapted to move in a slot 48 cut in the slidable bar 44. The length of this slot 48 is such that when the striker 47 engages either end thereof the bar 44 is moved to the right or left, as the case may be, to automatically move the clutches 23 or 35 out of engagement. Thus the movement of the sleeves 10 and 14 and the pivoted lever jacks 1 can be automatically regulated. If desired, the length of this slot 48 can be regulated by any suitable means such as by pins 49 passing through holes 50 in the said bar 44 so that the levers 1 could be raised or lowered to a predetermined degree. The slidable bar 44 is also provided with a slot 51 having three recesses 52 into one of which a stop 53 is adapted to be engaged, a suitable spring 54 being provided to normally hold the stop 53 engaged in one of the recesses 52. Thus when the stop 53 is in the middle recess 52 the slidable bar 44 and the clutches 23 and 35 are in their inoperative positions and the outer recesses will limit the movement of the bar 44 in either direction.

Figure 8:
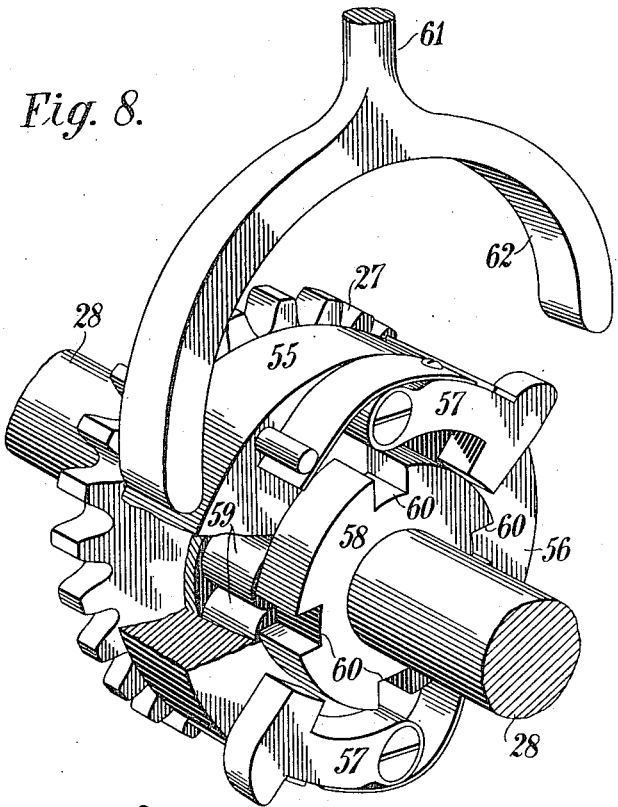
Fig. 8 is a perspective view of the driving clutch device in its inoperative position.
Figure 9:
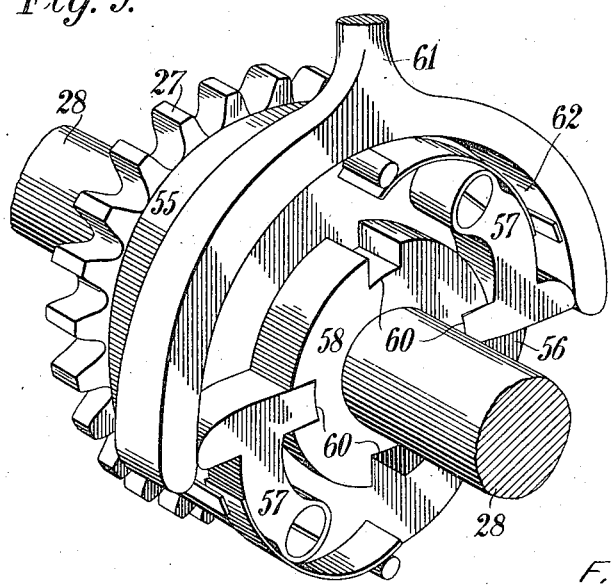
Fig. 9 is a similar view showing the clutch device in its operative position.

The threaded shaft 12 may be driven by any suitable means from the engine or "Cardan" shaft but a spur wheel drive to the shaft 21 and a chain wheel drive from this shaft 21 to the shaft 12 is preferably employed. The spur wheel 26 on the shaft 21 is driven by the spur wheel 27 which is provided or formed on a normally free member or sleeve 55 of a clutch 56 having a plurality of spring retracted pawls 57. This sleeve member 55 forming one part of the clutch 56 is adapted to rotate on a drive member 58 fixed on the engine shaft 28 and suitable antifriction means such as rollers 59 are provided between the two members 55 and 58. The drive member 58 is provided with a number of recesses 60 into which the pawls 57 on the sleeve member 55 are adapted to engage when projected inwardly by suitable means, such as an operating member 61 having a substantially semi-circular under face 62 as shown in Figs. 8 and 9, or by a longitudinally movable inner cone shaped sleeve member 63 adapted to engage suitably shaped side extensions 64 on the pawls 57 as shown in Fig. 10. The operating member 61 is connected by any suitable means such as levers and links to a pedal or a lever disposed adjacent to the driver's seat so that the clutch 56 can be controlled therefrom to drive the shaft 21.

The shaft 21 and the slidable bar 44 which are mounted in the bearings 21ª, 32 and 45 are arranged below the engine shaft 28 and preferably within the drip tray or cover 65 usually provided under the chassis 8 of the vehicle. These bearings are integrally formed in one with, or carried by, a frame 66 which is supported by a plurality of stays 67. These stays are connected at their lower ends to a U-shaped guide bar 68 which is secured at each end to bearings 69 which are adapted to carry the threaded shaft 12. These bearings 69 are in turn supported from the chassis frame 8 by suitably shaped stay bars 70. The U-shaped guide bar is provided with a slot 71 which is adapted to guide the striker 47 during its travel and also prevent the sleeve 14 from rotating and turning the tie bars 13. The other sleeve 10 is provided with an extension 72 which is adapted to ride in another slot 73 cut in the U-shaped guide bar 68 to prevent the sleeve 10 from rotating and turning the tie bars 9.

In operation, such as in the event of a puncture, the car is first stopped and the lever 61 or pedal by the driver's seat is operated to place the clutch 56 in its engaged position so that the spur wheel 26 on the longitudinal shaft 21 will be driven by the engine shaft 28 through the medium of the spur wheel 27. The driver now operates the other lever 46 also disposed adjacent to the driver's seat to move the sliding bar 44 so as to place the sliding portion 22 of the dog clutch 23 into engagement with the gear wheel portion 25 thereof. This operation will allow the longitudinal shaft 21 to be driven from the engine and rotated in one direction and this motion will be transmitted to the threaded shaft 12 through the sprocket wheels 20 and 18 and chain 19 so that the threaded sleeves 10 and 14 on the shaft 12 will move inwardly. This movement will draw the tie bars 9 and 13 inwardly to turn the jack levers 1 on their pivots to a more vertical position so that the lower ends 16 will contact with the ground and thereby raise the car 3 therefrom. When the desired height is reached the extension 47 on the sleeve 14 engages the inner end of the slot 48 in the slidable bar 44 and moves the bar 44 sidewise to withdraw the dog clutch 23 out of engagement and so stop the rotation of the shaft 21 and the movement of the levers or jacks 1. The engine can now be stopped or the clutch 56 can be disengaged if so desired and the puncture attended to. When the tire is repaired the engine is again started, the clutch 56 operated, and the hand lever 46 is moved in the other direction to move the slidable portion 37 of the clutch 35 into engagement with the other portion 34 of the clutch formed on the freely rotating bevel wheel 33. Thus the longitudinal shaft 21 will be rotated in the opposite direction through the medium of the bevel wheels 29, 30 and 33. The threaded sleeves 10 and 14 will now be moved outwardly through the medium of the sprocket wheels 20 and 18 and chain 19, and thus the pivoted lever jacks 1 will be brought back to their normal or raised position, which position is determined by the extension 47 engaging the other or outer end of the slot 48. When the extension 47 is thus engaged it will be seen that a further movement of the sleeve 14 will slide the bar 44 outwardly and automatically disengage the clutch 35 and stop the motion.

If desired, the longitudinal shaft 21 could be operated by any other suitable means instead of by the engine of the car or the threaded shaft 12 and the longitudinal shaft 21 could be combined and formed as one element. Suitable covers of leather or other suitable material may be provided to protect the working parts and prevent them being splashed by mud. In the present instance the main portion of the operating mechanism is inclosed by the usually provided drip tray 65. Tubular covers 74 of metal or the like are provided to inclose the threaded portions 11 and 15 of the shaft 12, and suitable leather or like packing 75 are also provided to prevent dirt entering the said tubular covers 74. Holes 76 may be provided in the covers 74 to enable the threaded portions of the shaft 12 to be lubricated. Thus the lifting device will be adequately protected from the weather when in its inoperative position.

It will be seen that by the above described means the whole of the car can be mechanically raised clear of the ground without any strain on the chassis which is caused when hand jacks are used to tilt the car and raise one wheel only. Also the car when raised can be easily moved sidewise or in any direction on the freely rotating balls 17 provided at the ends of the levers 1.

It will also be seen that the controlling mechanism of my improved jack is rendered fool-proof; for instance, should the control lever for operating the clutch be moved in mistake while the car is running the mechanism for operating the jack 1 is out of gear until the driver actuates the lever.

What I claim is:—

1. In a vehicle, a shaft journaled under the body of the vehicle and having ends provided with right and left threaded portions, a sleeve on each threaded portion of said shaft, front and rear members pivoted adjacent each end of each axle, connections between the front members and one of said sleeves, connections between the rear members and the other of said sleeves, a power driven shaft, an operative connection between said shafts, means for operating the power shaft whereby the front and the rear sets of pivoted members may be drawn downwardly in a direction toward the center of the vehicle, a guide mounted on the vehicle and having a slot in each end thereof, a slidable bar mounted on the vehicle, and a member projecting from each sleeve through the corresponding slot of said guide and connected to said slidable bar.

2. In a vehicle, a right and left threaded shaft, a sleeve having working fit on each threaded portion of said shaft, a slotted guide adjacent the shaft, a slidable bar mounted adjacent the guide, connections between the sleeves and the slidable bar and which extend through the slotted guide, jack members connected to the sleeves, connections between the jack members and the sleeves, and means to rotate the threaded shaft to operate said sleeves and thereby operate the jack members.

3. In a vehicle jack, opposed pivoted members, rectilinearly movable right and left threaded sleeves, a right and left threaded shaft having screw thread engagement with the said sleeves, a power driven shaft geared to the right and left threaded shaft, gear elements loose on the power driven shaft, connecting means between said gear elements to cause them to rotate in reverse directions, means for imparting rotary movement to one of said gear elements in the same direction, and clutches between the said power driven shaft and the respective gear elements loosely mounted thereon.

4. In a vehicle jack, opposed pivoted members, rectilinearly movable right and left threaded sleeves, a right and left threaded shaft having screw thread engagement with the said sleeves, a power driven shaft geared to the right and left threaded shaft, gear elements loose on the power driven shaft, connecting means between said gear elements to cause them to rotate in reverse directions, means for imparting rotary movement to one of said gear elements in the same direction, clutches between the said power driven shaft and the respective gear elements loosely mounted thereon, a slide bar, connecting means between the slide bar and the movable elements of the respective clutches, and means for moving the slide bar to throw one of the clutches into engagement, or both clutches into neutral.

5. In a vehicle jack, opposed pivoted members, rectilinearly movable right and left threaded sleeves, a right and left threaded shaft having screw thread engagement with the said sleeves, a power driven shaft geared to the right and left threaded shaft, gear elements loose on the power driven shaft, connecting means between said gear elements to cause them to rotate in reverse directions, means for imparting rotary movement to one of said gear elements in the same direction, clutches between the said power driven shaft and the respective gear elements loosely mounted thereon, a slide bar, connecting means between the slide bar and the movable elements of the respective clutches, means for moving the slide bar at the will of the operator, and means between the slide bar and one of the said sleeves to automatically move the slide bar to throw the movable clutch elements into neutral position.

6. In a vehicle jack, oppositely disposed pivoted members, a right and left threaded shaft disposed in the plane of movement of said pivoted members, sleeves mounted upon the threaded portions of said shaft, connecting means between the sleeves and the said pivoted members, a power driven shaft geared to the right and left threaded shaft, gear elements loose upon the power driven shaft and connected to rotate in reverse directions, means for imparting rotary movement to one of said gear elements in the same direction, clutches between the power driven shaft and the respective gear elements loosely mounted thereon, a slide bar having connection with the movable members of the respective clutches, means for moving the slide bar at the will of the operator to throw one of the clutches into active operation, a guide member, and means connected with one of the said operating members and coacting with the guide member and having a limited movement with respect to said slide bar for automatically operating the latter to throw the said clutches into neutral position.

7. In a vehicle jack, oppositely disposed pivoted members, right and left threaded sleeves having connection with the pivoted members, a right and left threaded shaft having the sleeves mounted thereon for imparting a reverse rotary movement to said shaft, a guide disposed contiguous to the shaft and having longitudinal slots in its ends, and means projecting from the respective sleeves and entering the longitudinal slots of the said guide and movable therein.

In testimony whereof I have hereunto signed my name to the accompanying specification.

FRED. LIONEL RAPSON.